Sept. 17, 1968          G. J. DERRIG          3,401,579

ENGINE BALANCER

Filed Feb. 23, 1967          3 Sheets-Sheet 1

Sept. 17, 1968  G. J. DERRIG  3,401,579
ENGINE BALANCER

Filed Feb. 23, 1967  3 Sheets-Sheet 2

Sept. 17, 1968  G. J. DERRIG  3,401,579
ENGINE BALANCER
Filed Feb. 23, 1967  3 Sheets-Sheet 3

Inventor
George J. Derrig
Attorney

United States Patent Office 3,401,579
Patented Sept. 17, 1968

3,401,579
ENGINE BALANCER
George J. Derrig, Park Forest, Ill., assignor to Allis-Chalmers Manufacturing Company, Milwaukee, Wis.
Filed Feb. 23, 1967, Ser. No. 617,985
4 Claims. (Cl. 74—604)

ABSTRACT OF THE DISCLOSURE

A balancing system for a V-8 engine to neutralize accelerating and decelerating forces of reciprocating parts and unbalanced couples inherent with offset opposing banks of cylinders in this type of an engine.

---

This invention relates to an engine balancer and more partcularly to a balancer for a V-8 engine having offset banks of cylinders.

Moving parts of an internal combustion engine have variable motion and therefore acceleration causing inertia forces which tend to produce vibrations. Such forces, particularly in the case of high speed engines, may produce noise, cause undue wear and tear on the engine and the support, and damage connected drive and driven members. A further danger is present when the natural frequency of vibration coincides with the frequency of the inertia forces to produce a resonant condition. Accordingly, it is advisable to neutralize or at least minimize these forces as far as it is practical to prolong the life and avoid damage to the engine.

The force unbalance and moment unbalance in a 60° V-8 engine having a single plane crankshaft and corresponding cylinders in opposite banks offset to have their respective connecting rods connected in side by side relationship on a common crank throw, may be conssidered in terms of a four cylinder in-line engine. Each bank of a V-8 is comprised of four in-line cylinders having the unbalanced characteristics of a four cylinder engine with a single plane crank arrangement. That is, the sum of the accelerating forces acting on the reciprocating elements form a sinusoidal resultant force acting parallel to the cylinder axes at the longitudinal center line of the bank. The frequency of this resultant is twice that of the crankshaft rotation and hence is referred to as the second order force unbalance or the second harmonic of the inertia forces.

The vector summation of the second order forces existing in the two banks of the 60° V-8 engine resolves itself into forces and couples described as follows: an unbalanced force A acting at the longitudinal center line of the engine and rotating at twice engine speed in the direction of engine rotation; an unbalanced coupled formed by parallel, equal and noncollinear forces $B_1$ and $B_2$ opposite in sense and the arm between these forces, this couple rotating at twice the engine speed in the direction of engine rotation; and another unbalanced couple also formed by paralleled, equal, noncollinear forces $C_1$ and $C_2$ opposite in sense and the arm between them, this couple rotating at twice engine speed in the direction opposite engine rotation.

The above two couples are caused by the offset between connecting rods and would not have been encountered if fork and blade type rods were used in place of the side by side positioning of the connecting rods from opposing banks of pistons on the crank bearing.

Accordingly, this invention uses a balancing system having pairs of rotating weights to overcome the unbalance in a 60° angle V-8 engine having offset banks of cylinders. The pairs of weights are positioned on the engine in a manner that no additional couples are introduced while correcting the engine unbalance.

It is an object of this invention to unbalance a V-8 engine by the use of five rotating weights.

It is another object of this invention to position gear driven balancing weights off center from the crankshaft axis without introducing any further unbalancing couples in the system.

It is a further object of this invention to provide an engine balancing system for a V-8 engine to neutralize the accelerating and decelerating forces of the reciprocating parts and to neutralize unbalanced couples inherent with offset opposing banks of cylinders in this type of an engine.

The objects of this invention are accomplished by positioning a pair of rotating weights on parallel axes diametrically opposite the crankshaft axis on the forward and rearward ends of the engine. The resultant force of the rotating weights acts through the center line of the crankshaft to balance the resultant rotating force on the crankshaft due to the accelerating and decelerating of the reciprocating elements of the engine.

The couples which are created because of the offset of the banks of cylinders and the side by side positioning of the connecting rods on the crank bearing are neutralized by additional weights. A second pair of rotating weights are positioned on an axis common with one of the first pair of weights at the forward and rearward ends of the engine to neutralize the couple rotating in the same direction as engine rotation. One of these weights is combined with a weight for unbalancing the rotating force in the engine to produce a resultant force to partially neutralize the couple and rotating force simultaneously. In other words, three weights neutralize the unbalance force and a couple.

A second pair of weights on another axis is also rotated in response to a drive gear which rotates counter to engine rotation at twice the engine speed to neutralize the other couple produced in this type of an engine. The forces produced by the combination of these balancing weights will not add any new moment unbalance or force unbalance and will substantially minimize the unbalance in this type of an engine.

Referring to the drawings.

Figure 1:
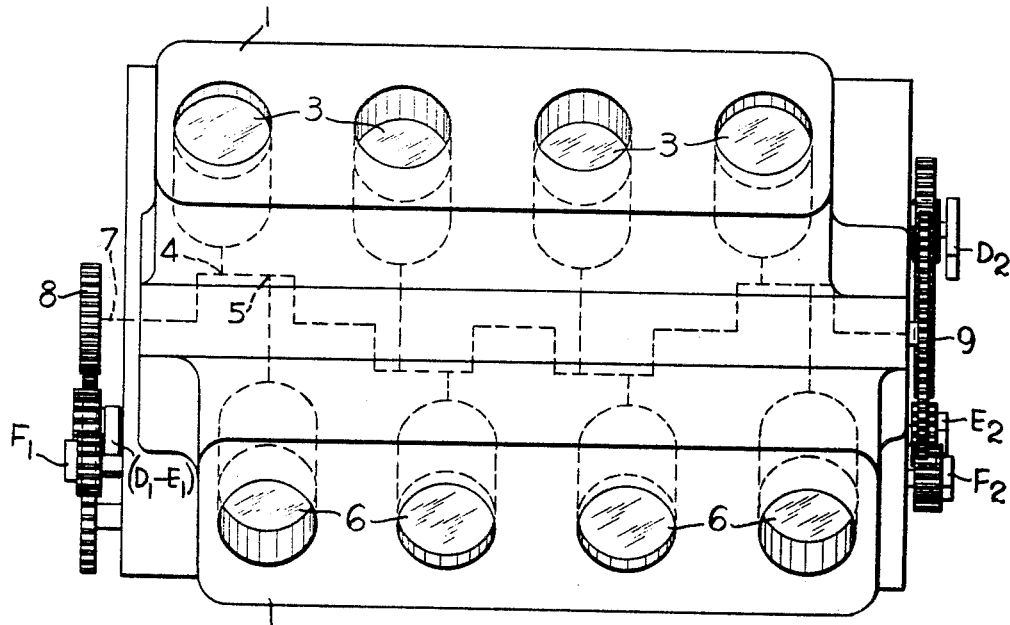
FIG. 1 is a plan view schematically illustrating a V-8 engine.
Figure 2:
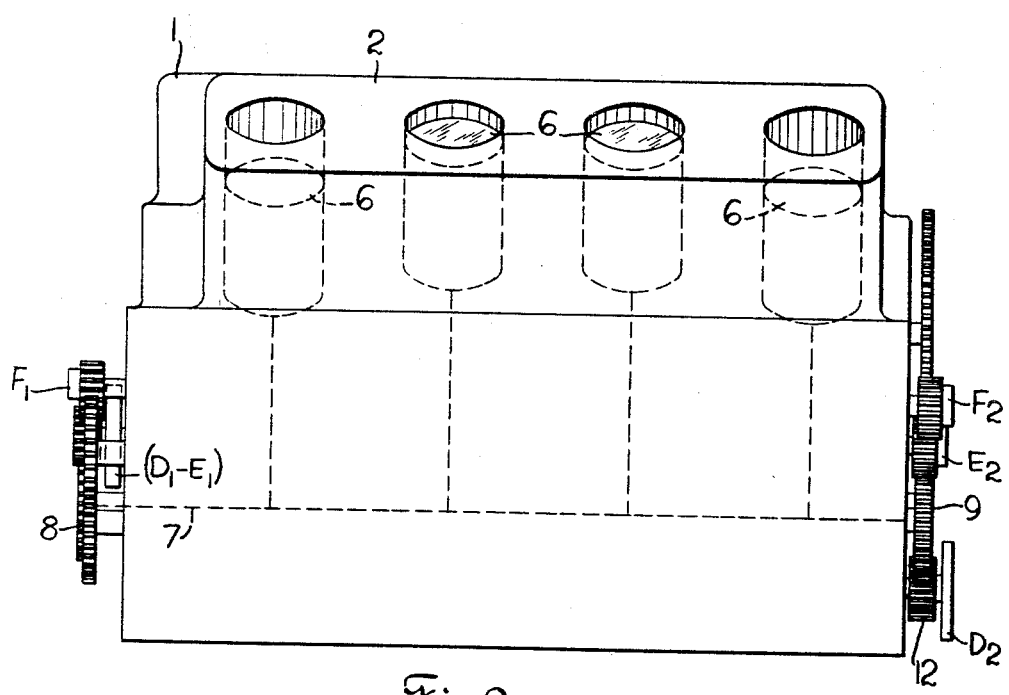
FIG. 2 is a side elevation view schematically illustrating a V-8 engine.

Referring to FIG. 1, the bank of cylinders 1 are offset forwardly relative to the bank of cylinders 2. The pistons 3 and 6 are connected by the connecting rods to the crank bearings. Accordingly the connecting rods connected to the piston 3 in the bank 1 are offset forwardly at a point 4 the width of the rod on the crank bearing relative to the point of connection 5 of the piston rods connecting the piston 6 in the cylinder bank 2. The offset produces two rotating couples in the V-8 engine which must be neutralized or substantially minimized. The crankshaft 7 is supported on the main bearings and drives a gear 8 on the forward end and a gear 9 on its rearward end. These gears are used to drive a gear balancing mechanism. The balancing mechanism is offset relative to the center of the engine because of space limitations in the center of the engine. The offset of the balancing weights counterbalance each other and prevent introduction of any new unbalance.

The balancing system neutralizes unbalanced force A by rotating two weights $D_1$ and $D_2$ located diagonally relative to crankshaft centerline at the front and rear of the engine, respectively, so that the resultant force produced by the rotating weights acts through the longitudinal centerline of the engine in the direction opposite and having a magnitude equal to the unbalanced force A. The weights are driven by the gears 11 and 12 respectively supported by stationary shafts 10 and 13. Gear 14 is driven by gear 9 and drives gear 12. Gear 11 is driven by gear 16.

Figure 3:
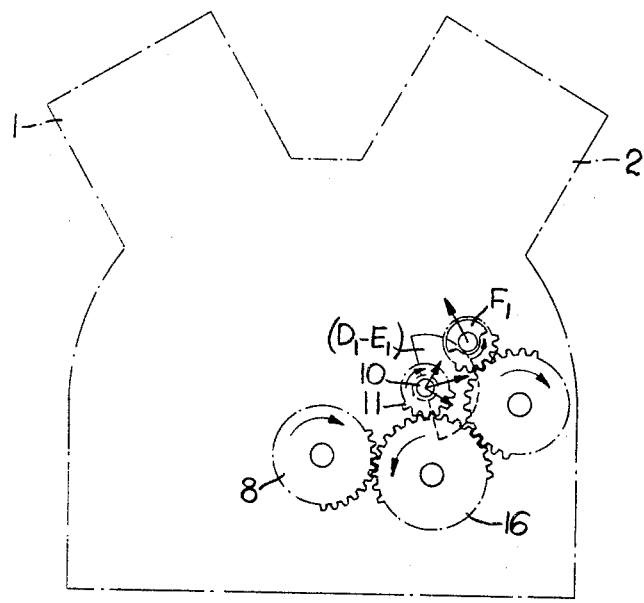
FIG. 3 is a view illustrating the front end of a V-8 engine showing the balancing mechanism.
Figure 4:
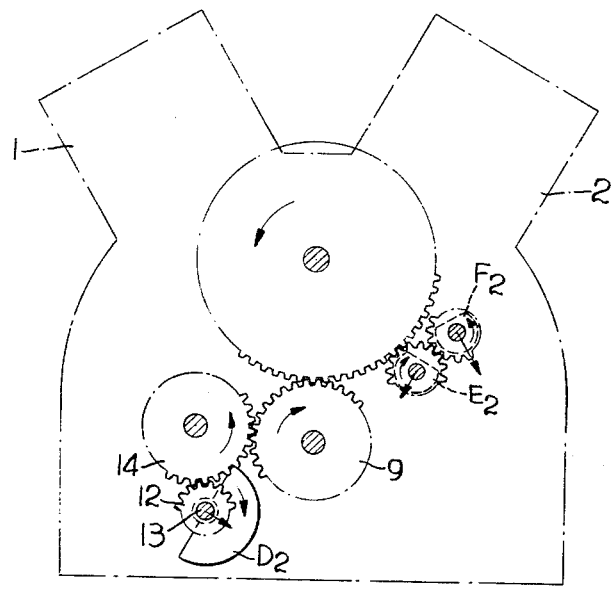
FIG. 4 is a view taken in the same direction as FIG. 3 illustrating the balancing mechanism on the rear end of the V-8 engine.

The weight $D_1$ on the front end of the engine is combined with a weight $E_1$ as shown in FIG. 3, the latter weight producing a correcting force for overcoming an unbalanced couple. Directly behind $E_1$ on the same longitudinal axis is located weight $E_2$ which produces the other correcting force for neutralizing the moment unbalance caused by $B_1$ and $B_2$, shown in FIGS. 5, 6 and 7.

Figure 7:
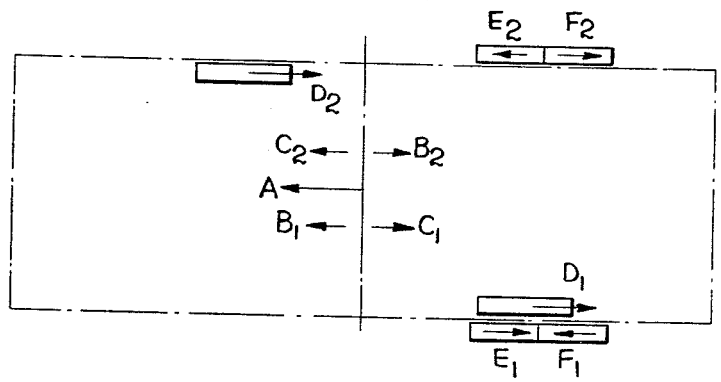
FIG. 7 is the plan view of the force diagram illustrating the balancing system.
Figure 5:
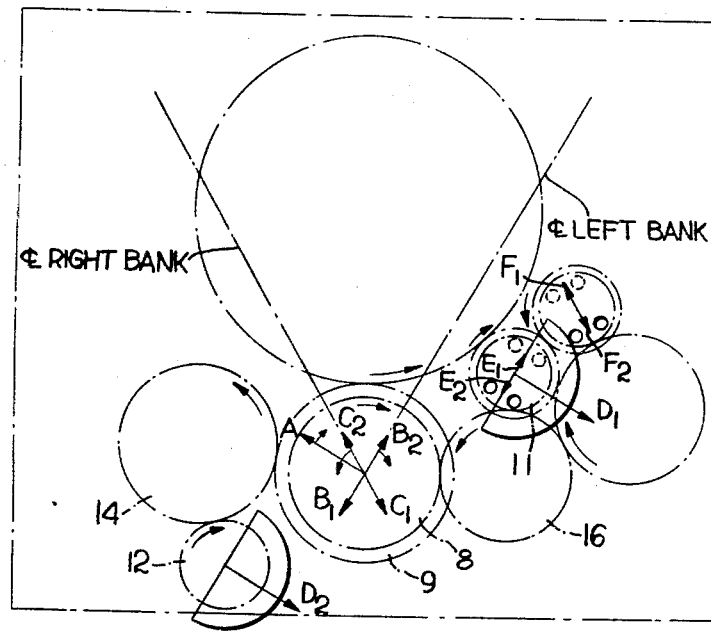
FIG. 5 is the front view of a force diagram illustrating the balance system.
Figure 6:
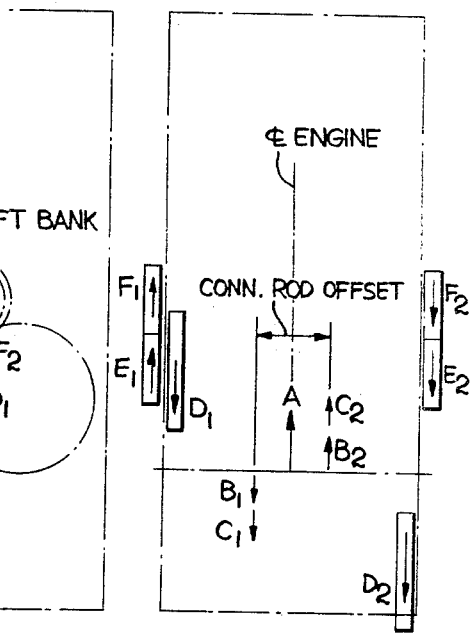
FIG. 6 is the side view of the force diagram illustrating the balancing system.

On another convenient longitudinal axis are added weights $F_1$ and $F_2$ at the front and rear of the engine, respectively, rotating in a counterdirection of engine rotation, forming a correcting couple equal in magnitude and opposite in direction to the moment unbalance caused by $C_1$ and $C_2$, shown in FIGS. 5, 6 and 7. Accordingly, the force unbalance and moment unbalance are neutralized and no new force or moment unbalances are introduced in the process.

The force diagrams illustrated in FIGS. 5, 6 and 7 aid in illustrating the function of the balancing system. Referring to these figures, the force A acts at a center point on the engine crankshaft. Force A is neutralized by the weights $D_1$ and $D_2$ which produce two forces, the resultant of which is equal to an opposite of force A to completely neutralize force A. $D_1$ is positioned on the front end of the engine and $D_2$ is positioned diagonally on the rear end of the engine. The weights $D_1$ and $D_2$ rotate at twice the speed of the engine and counteract the force of A.

The unbalanced couple formed by $B_1$ and $B_2$ and its arm is neutralized by the couple formed by $E_1$ and $E_2$ and its arm. The weight $E_1$ as illustrated is formed by the removal of a portion of the gear on the front side which produces a force vector in opposition to $B_1$ on the front end of the engine. On the rear end of the engine is positioned a similar gear with a portion of the gear removed to produce the force vector $E_2$ in opposition to the force $B_2$. The couple formed by $E_1$ and $E_2$ having been made equal and opposite to the couple formed by $B_1$ and $B_2$ neutralize this latter couple.

The unbalanced couple formed by $C_1$ and $C_2$ and its arm is neutralized by forces produced by weights $F_1$ and $F_2$ and their arm. Weights $F_1$ and $F_2$ are rotated about a convenient axis. Similarly the force from weight $F_1$ and force $C_2$ act through a point which produces a resultant force equal to and opposite from the resultant force produced by force $C_1$ and the weight of $F_2$.

The corrective weights producing forces are illustrated by arrows schematically in FIGS. 5, 6 and 7. In analyzing the force diagram, the force components are shown in FIGS. 6 and 7 which counteract the unbalance components of force. The force unbalance and moment unbalance produced in the engine are A, $B_1$ and $B_2$, and $C_1$ and $C_2$. Accordingly, it can be seen that the resultant forces of weights $D_1$ and $D_2$ always neutralize the force A, and the unbalanced couples are also neutralized by forces producing couples which will neutralize the unbalanced couples and provide for a balanced engine without introducing any new unbalance couples.

The balancing system utilizes five weights which are rotating at twice engine speed. One of the weights provides the dual function of assisting in neutralizing a rotating force unbalance on the engine crankshaft while simultaneously providing one force of an unbalancing couple which is also rotating at the same speed. The balancing couples are formed by weights rotating on their common axis at opposite ends of the engine. The correcting forces are opposite in sense, noncollinear and in synchronism with and equal to the unbalance force couple produced during engine operation. Accordingly, the balancing system is provided through the use of weights positioned in such a manner that engine unbalance is substantially eliminated to thereby produce a smooth operating engine.

The preferred embodiments of this engine have been illustrated and described and it is understood that other inventions may be devised that would fall within the scope of the attached claims which define this invention.

The embodiments of the invention in which an exclusive property or privilege is claimed are defined as follows:

1. In a V-type engine having offset banks of cylinders with pistons connected by rods to crank arms in side by side relationship and the crank arms lying in a common plane, said engine having force unbalance and moment unbalance conditions, a balancing system comprising, a pair of eccentric weights located diagonally opposite the crankshaft centerline on the front and rear of said engine rotating at a harmonic and in the direction of engine rotation for neutralizing the force unbalance in the engine, a second pair of eccentric weights mounted coaxially with one of said pair of eccentric weights on the front and the rear of said engine rotating at a harmonic of and in the direction of engine rotation for neutralizing a moment unbalance, a third set of eccentric weights mounted at the front and rear of said engine on another axis parallel with said crankshaft axis and rotating at a harmonic of in reverse direction from the engine rotation for neutralizing a second moment unbalance thereby providing a balancing system without introducing additional force or moment unbalance in the engine.

2. A balancing system as set forth in claim 1 wherein one of said second pairs of weights is combined with one of said first pairs of weights to provide a resultant mass generating a resultant force to simultaneously neutralize a portion of a force unbalance and a moment unbalance.

3. A balancing system set forth in claim 1 wherein the force balancing weights produce a resultant of equal magnitude, opposite in direction and collinear with the force unbalance inherent in the engine.

4. A balancing system as set forth in claim 1 wherein the pairs of weights for balancing the moment unbalances produce balancing couples which combined with the moment unbalances to produce resultant collinear forces equal in magnitude and opposite in direction to neutralize moment unbalance rotating in either direction.

References Cited

UNITED STATES PATENTS

| | | | |
|---|---|---|---|
| 1,898,459 | 2/1933 | Newcomb | 74—604 |
| 2,566,476 | 9/1951 | Zuhn | 74—604 |
| 3,110,195 | 11/1963 | Hanley | 74—604 |

FOREIGN PATENTS

| | | |
|---|---|---|
| 676,015 | 7/1952 | Great Britain. |
| 972,544 | 10/1964 | Great Britain. |

FRED C. MATTERN, Jr., *Primary Examiner.*

B. T. CALLAHAN, *Assistant Examiner.*